United States Patent
Venkatachalam et al.

(10) Patent No.: US 8,441,984 B2
(45) Date of Patent: May 14, 2013

(54) WIRELESS DEVICE AND METHOD FOR EFFICIENTLY PAGING IDLE-MODE MOBILE STATIONS IN MULTICARRIER SYSTEMS

(75) Inventors: Muthaiah Venkatachalam, Beaverton, OR (US); Kamran Etemad, Potomac, MD (US); Shantidev Mohanty, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 258 days.

(21) Appl. No.: 12/862,120

(22) Filed: Aug. 24, 2010

(65) Prior Publication Data

US 2011/0122833 A1 May 26, 2011

Related U.S. Application Data

(60) Provisional application No. 61/275,266, filed on Aug. 24, 2009.

(51) Int. Cl.
*H04Q 7/00* (2006.01)
*H04Q 7/24* (2006.01)

(52) U.S. Cl.
USPC .......................................... 370/328; 370/338

(58) Field of Classification Search .................. 370/294, 370/321, 322, 328, 329, 337, 338, 347–349
See application file for complete search history.

(56) References Cited

U.S. PATENT DOCUMENTS

| | | | | |
|---|---|---|---|---|
| 5,150,362 | A * | 9/1992 | Akerberg | 370/331 |
| 6,307,846 | B1 * | 10/2001 | Willey | 370/329 |
| 7,142,520 | B1 * | 11/2006 | Haverinen et al. | 370/311 |
| 7,292,868 | B2 * | 11/2007 | Laroia et al. | 455/458 |
| 8,150,395 | B2 * | 4/2012 | Cho et al. | 455/435.1 |
| 8,165,072 | B2 * | 4/2012 | Mooney et al. | 370/329 |
| 8,233,428 | B2 * | 7/2012 | Ernstrom et al. | 370/324 |
| 2006/0116123 | A1 * | 6/2006 | Purnadi et al. | 455/435.1 |
| 2008/0084941 | A1 * | 4/2008 | Mohanty et al. | 375/260 |

* cited by examiner

*Primary Examiner* — Hong Cho
(74) *Attorney, Agent, or Firm* — Schwegman, Lundberg & Woessner, P.A.

(57) ABSTRACT

Embodiments of a mobile station and a method performed by a base station for transmitting a paging message to an idle-mode mobile station are disclosed herein. In some embodiments, a multicarrier paging information (MC-PAG-Info) message is transmitted to indicate a time-slot and paging carrier for a subsequent transmission of a paging message to an idle-mode mobile station. The idle-mode mobile station may monitor the indicated paging carrier during the indicated time-slot of a paging listening interval for receipt of a paging message directed to the idle-mode mobile station. In some embodiments, the indicated time-slot and the paging carrier are determined by the idle-mode mobile station using a device identifier of the idle-mode mobile station and hash modulo parameters provided within the paging information message.

19 Claims, 3 Drawing Sheets

WIRELESS DEVICE AND METHOD FOR EFFICIENTLY PAGING IDLE-MODE MOBILE STATIONS IN MULTICARRIER SYSTEMS

PRIORITY CLAIM

This application claims the benefit of priority under 35 U.S.C. 119(e) to U.S. Provisional Patent Application Ser. No. 61/275,266, filed Aug. 24, 2009, which is incorporated herein by reference in its entirety.

TECHNICAL FIELD

Embodiments pertain to multicarrier wireless networks. Some embodiments relate to wireless networks configured in accordance with one of the IEEE 802.16 standards or proposed standards, such as IEEE 802.16(m). Some embodiments relate to wireless networks configured in accordance with a 3GPP Long Term Evolution (LTE) communication standard.

BACKGROUND

Broadband wireless access (BWA) networks typically support an idle-mode to minimize the power consumption of mobile stations. During the idle-mode, a mobile station wakes up during its paging listening interval to receive paging messages. A previously indicated paging offset is used by the mobile stations to determine the location of the paging listening interval.

In some broadband wireless access networks, such as IEEE 802.16(m) networks, is that the paging offset may correspond to a number of superframes. Each superframe, for example, may have four frames. As a result, the paging listening interval may cover an amount of time that is much greater than the time needed for a mobile station to receive a paging message. This is inefficient for a mobile station. Another issue with some broadband wireless access networks is that an idle-mode mobile station may not need to listen for paging messages on all carriers during the paging listening interval.

Thus there are general needs for wireless devices and methods for more efficient paging in broadband wireless access networks.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
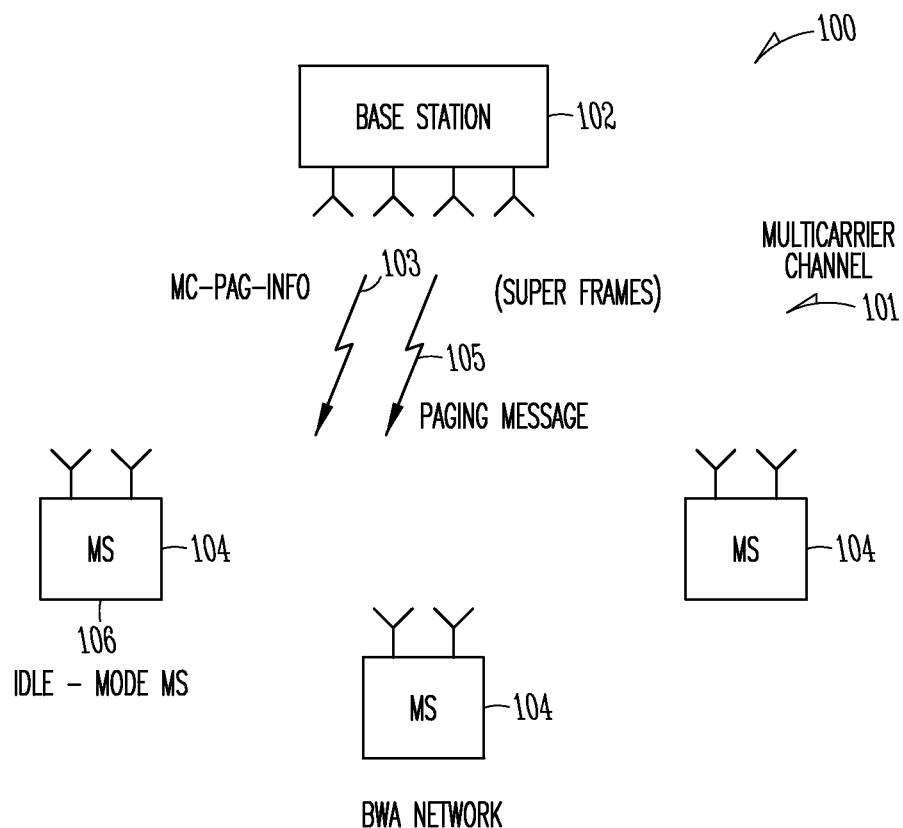
FIG. 1 illustrates a broadband wireless access network in accordance with some embodiments.

FIG. 1 illustrates a broadband wireless access network in accordance with some embodiments. Broadband wireless access network 100 may include a base station 102 and one or more mobile stations 104, some of which may be in idle-mode, such as idle-mode mobile station 106. In accordance with embodiments, an idle-mode mobile station 106 may monitor a single carrier during a single time-slot within its paging listening interval to receive a paging message 105. Accordingly, power consumption as well as air-link signaling overhead may be reduced. In some embodiments, the base station 102 may transmit a multicarrier paging information (MC-PAG-Info) message 103 to indicate the time-slot and the paging carrier for the subsequent transmission of the paging message 105 to the idle-mode mobile station 106. The multicarrier paging information message 103 may be transmitted on one or more carriers of a multicarrier channel 101.

As illustrated in FIG. 1, base station 102 and mobile stations 104 may utilize a plurality of antennas for MIMO communications over the multicarrier channel 101. In some embodiments, broadband wireless access network 100 may be a WiMAX network, an IEEE 802.16(m) network, a 3GPP LTE network, or a fourth-generation (4G) network. The base station 102 and the mobile stations 104 may communicate using an orthogonal frequency division multiple access (OFDMA) communication technique. In IEEE 802.16(m) embodiments, an OFDMA multiple access scheme may be used in both the downlink and the uplink.

Figure 2:
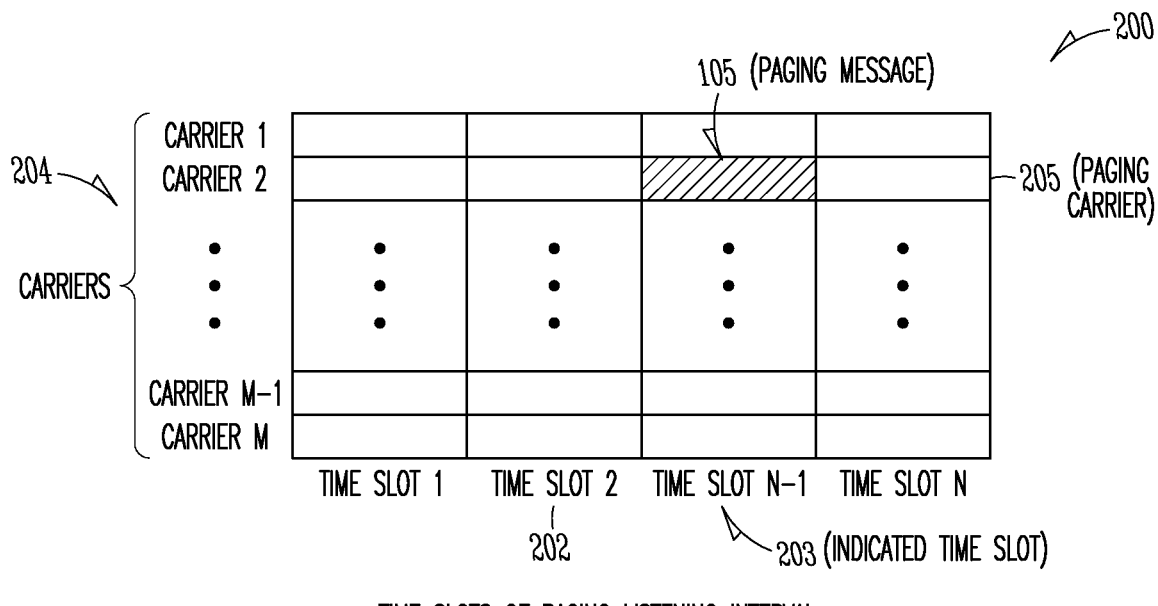
FIG. 2 illustrates time-slots and carriers of a paging listening interval in accordance with some embodiments.

FIG. 2 illustrates time-slots and carriers of a paging listening interval in accordance with some embodiments. Paging listening interval 200 may comprise a plurality of time-slots 202 of the multicarrier channel 101 (FIG. 1), which may comprise a plurality of carriers 204. The multicarrier paging information message 103 (FIG. 1) may be configured to indicate a time-slot 203 and paging carrier 205 for a subsequent transmission of the paging message 105 to the idle-mode mobile station 106 (FIG. 1). The paging message 105 may be located somewhere within the indicated time-slot 203 on the paging carrier 205.

In some embodiments, the base station 104 transmits the paging message 105 to the idle-mode mobile station 106 only on the indicated paging carrier 205 (rather than transmitting the paging message 105 on all carriers 204) during the indicated time-slot 203 of the paging listening interval 200 of the idle-mode mobile station 106. In these embodiments, an idle-mode mobile station 106 may be configured to refrain from listening for a paging message on any carriers 204 except for the indicated paging carrier 205 indicated in the paging information message 103. In these embodiments, the idle-mode mobile station 106 may also be configured to refrain from listening for a paging message 105 during any time-slots 202 of the paging listening interval 200 except for the time-slot 203 indicated in the paging information message 103.

In some embodiments, the indicated time-slot 203 and the paging carrier 205 may be determined by the idle-mode mobile station 106 using a device identifier (DID) of the idle-mode mobile station 106 and hash modulo parameters provided within the multicarrier paging information message 103. As described in more detail below, the multicarrier paging information message 103 is transmitted before the paging listening interval 200 of the idle-mode mobile station 106.

In some embodiments, the multicarrier paging information message 103 may be configured to include a time-slot hash modulo (HMT) parameter and a carrier hash modulo (HMC) parameter. The idle-mode mobile station 106 may be configured to determine the paging carrier 205 and the indicated time-slot 203 by performing modular operations on the carrier hash modulo parameter and the time-slot hash modulo parameter, respectively. In some embodiments, the indicated time-slot 203 may be further determined from a paging offset time and the paging carrier 205 may be further determined from a paging offset carrier. In some embodiments, the paging offset time and the paging offset carrier may be determined from the following equations:

paging offset time=mobile station identifier modulo HMT.

paging offset carrier=mobile station identifier modulo HMC.

The mobile station identifier may be an identifier, such as a DID of the idle-mode mobile station 106, that may uniquely identify the idle-mode mobile station 106. In these embodiments, the value of the HMC parameter may be the number of carriers used by the base station 102 for transmitting a paging message to the idle-mode mobile station 106. In some embodiments, all carriers 204 of the multicarrier channel 101 may be used, while in other embodiments, one or more carriers 204 or a subset of the carriers 204 may be used.

The value of the HMT parameter may be the number of time-slots 202 within the paging listening interval 200 of an idle-mode mobile station 106 during which the base station 104 may transmit the paging message 105 to the idle-mode mobile station 106. In some IEEE 802.16(m) embodiments, a time-slot may correspond to one frame. The HMT parameter may, for example, be four when the paging listening interval comprises one superframe which comprises four frames in which one frame is equal to one time-slot.

In some of these embodiments, the base station 102 may send HMC and HMT parameters to idle-mode mobile stations before their paging listening intervals within a multicarrier paging information message 103. In some embodiments, the multicarrier paging information message 103 may be multicasted or broadcasted to all idle-mode mobile stations. In some embodiments, the base station 104 may select the paging carrier 205 from one of the plurality of carriers 204 of the multicarrier channel 101.

In some embodiments, the base station 104 may provide a mobile station 104 with a paging offset and a paging cycle to indicate to the mobile station 104 a location of the paging listening interval 200 within a frame structure (e.g., to indicate the location within in superframe). The paging offset and the paging cycle may be provided by the base station 102 prior to the mobile station 104 entering idle-mode. For example, the paging offset and the paging cycle may be provided with respect to either one or more sub-frames, one or more frames, or one or more superframes. In some IEEE 802.16(m) embodiments, the paging offset unit may be a number of superframes (e.g., 1-2 superframes which may be 4 or 8 frames). In these embodiments, an idle-mode mobile station 106 may be configured to be awake only during the indicated time slot 203 and may be configured to listen only to the paging carrier 205 to receive a paging message 205. This is unlike some conventional approaches in which a mobile station may listen during the entire paging listening interval 200, which in accordance some IEEE 802.16(m) may range from twenty to forty milliseconds. This is a lot of time for a mobile station to be awake in idle-mode, particularly since only a single frame may be needed to receive a paging message.

A paging message 105 may indicate that that there is downlink traffic for an idle-mode mobile station 106. In some embodiments, the paging message 105 may be transmitted once every paging cycle during a paging listening interval 200. The paging message 105 may indicated when and where within a downlink subframe that the downlink traffic is to be received by the idle-mode mobile station 106.

In some embodiments, the multicarrier paging information message 103 may include a field to indicate a number of carriers 204 used for transmission of the paging message 105. In some embodiments, a bitmap having bits set may be used to indicate which carriers 204 of the plurality of carriers are used as paging carriers. These embodiments are described in more detail below.

In some embodiments, the multicarrier paging information message 103 may include a paging carrier indicator field (size=1 bit) to indicate if the current carrier transmitting the multicarrier paging information message 103 is the carrier that is used to transmit a paging message 105 for an idle-mode mobile station 106. When the paging carrier indicator field indicates that the current carrier is used to transmit the paging message for idle-mode mobile stations, the multicarrier paging information message 103 may also include a field to indicate the number of carriers for transmission HMC parameter (size=N). This field may either indicate that all the carriers or a subset of one or more of the carriers. N=roof(log$_2$(HMC$_{max}$)) where HMC$_{max}$ may be the maximum number of carriers 204 of the multicarrier channel 101 utilized by the base station 102.

The multicarrier paging information message 103 may also include a field that includes information about each carrier used for transmission of paging messages 105. This field may be an information about carrier 'i' field (size=M) and may be specified in a loop (for i=1, i<=HMC, i++). In this field, M bits may be used to convey the information about each carrier. This information may include different parameters that may be used by an idle-mode mobile station 106 to receive a paging message 105 on the indicated paging carriers. The parameters may include center carrier frequency, carrier bandwidth, etc. When a mobile station 104 receives this information during network entry or by a neighbor advertisement (NBR-ADV) message or a multicarrier advertisement (MC-ADV) message, an index of a table that includes the information for each carrier may be transmitted then instead of transmitting the entire information. In some embodiments, the information may be specified with a bitmap (e.g., instead of the loop), such as an M-bit bit map. The bits of the bitmap may be set to indicate which carriers 204 that are used as paging carriers 205.

In some embodiments, the multicarrier paging information message 103 may also include a carrier information change count field (size=K). In the case that a mobile station 104 receives detailed carrier information through network entry or by a NBR-ADV or MC-ADV message, the mobile station 104 may use this field to determine if it has the latest carrier information. If the carrier information change count received by a mobile station in the multicarrier paging information message 103 is higher than the one stored in the mobile station 104, the mobile station may be configured to receive the most recent carrier information (e.g., by a NBR-ADV or MC-ADV message), although this is not a requirement.

As described in more detail below, the multicarrier paging information message 103 may be transmitted by the base station 102 as part of a paging group ID (PGID) information message at the beginning of the paging listening interval 200 of the idle-mode mobile station 106.

Figure 3:
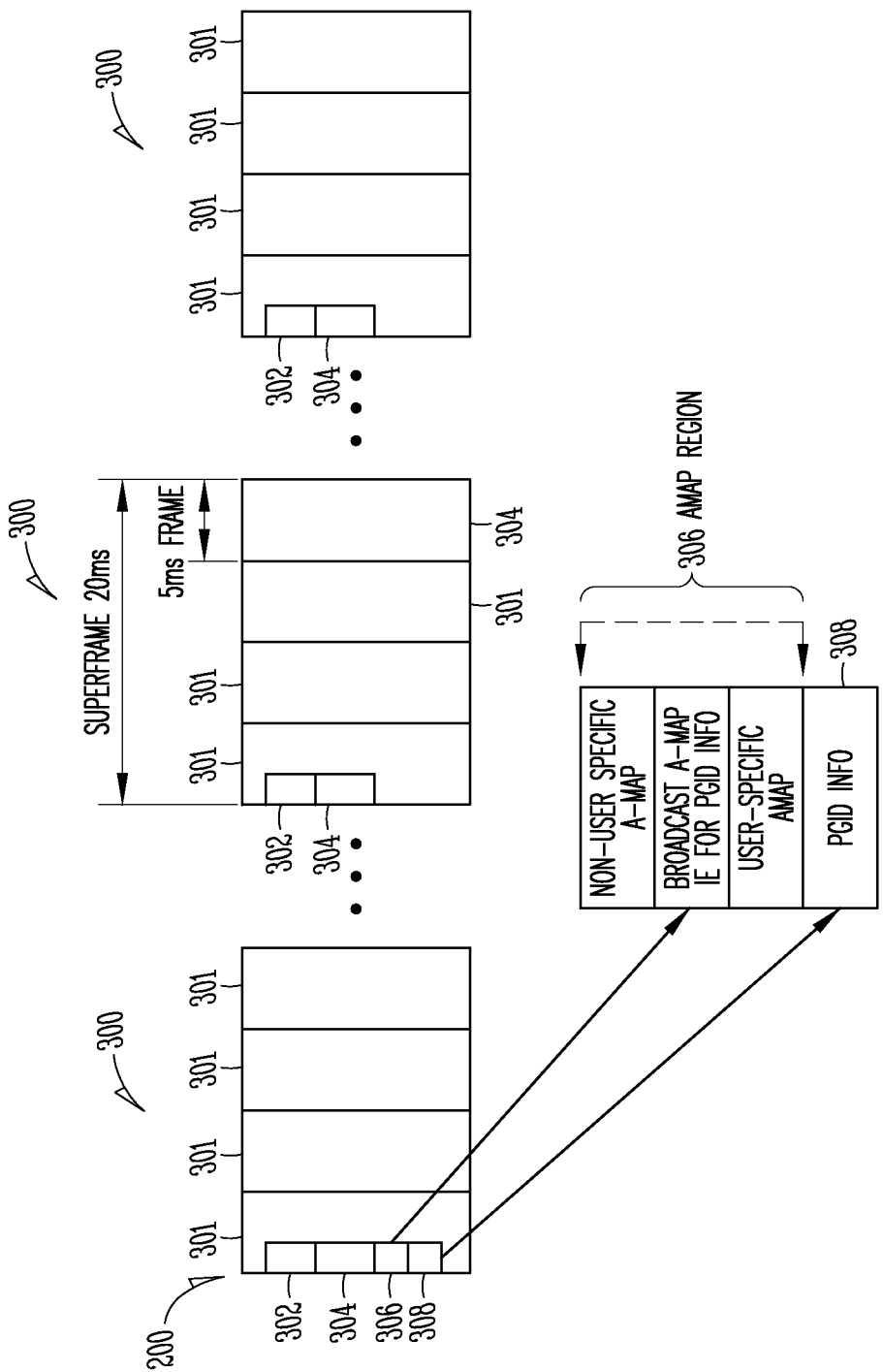
FIG. 3 illustrates the inclusion of paging information in superframes in accordance with some embodiments.

FIG. 3 illustrates the inclusion of paging information in superframes in accordance with some embodiments. Superframes 300 may each comprise a plurality of frames 301 and may span a multicarrier bandwidth of the multicarrier channel 101 (FIG. 1) comprising a plurality of carriers. In some IEEE 802.16(m) embodiments, each superframe 300 may be twenty milliseconds and may comprise four five-millisecond frames 301. In these embodiments, the multicarrier paging information message 103 may be transmitted by the base station 102 as part of a paging group ID information message 308 at the beginning of the paging listening interval 200 of the idle-mode mobile station 106.

In some IEEE 802.16(m) embodiments, each superframe 300 may include a primary superframe header 302 and a secondary superframe header 304. In addition to the paging group ID information message 308, at the beginning of the paging listening interval 200, the superframe 300 may include an advanced map (A-MAP) region 306 that may include a non-user specific A-MAP, a broadcast A-MAP information element (IE) for including the PGID information, and a user-specific A-MAP.

Figure 4:
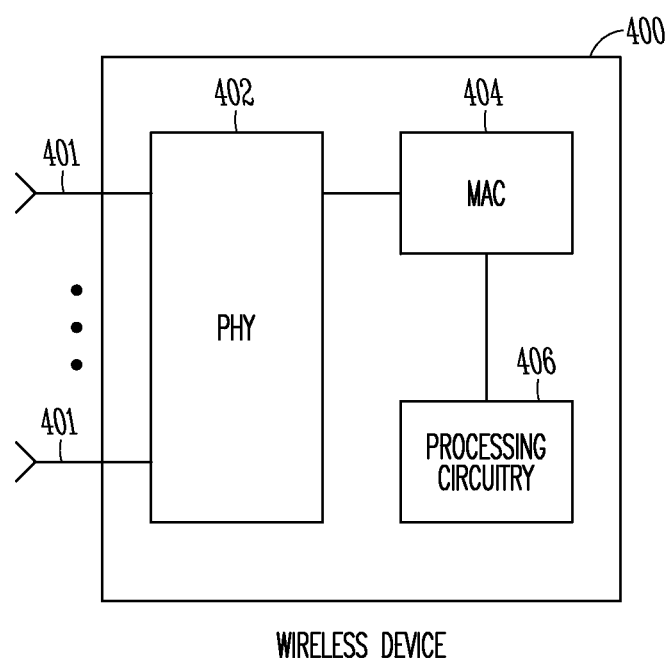
FIG. 4 illustrates a wireless device in accordance with some embodiments.

FIG. 4 illustrates a wireless device in accordance with some embodiments. Wireless device 400 may be suitable for use as base station 102 (FIG. 1) or as any of mobile stations 104 (FIG. 1). Wireless device 400 may include physical (PHY) layer circuitry 402 to communicate over a multicarrier channel using antennas 401, media-access control (MAC) layer circuitry 402 to control access to the media (i.e., the multicarrier channel 101 (FIG. 1)), and processing circuitry 406 to perform various operations including those described herein.

In some embodiments, when the wireless device 400 is configured as a mobile station to operate in idle-mode in a broadband wireless access network, the physical-layer circuitry 402 may be configured receive a multicarrier paging information message 103 (FIG. 1) indicating a time-slot 203 (FIG. 2) and paging carrier 205 (FIG. 2) for a subsequent transmission of a paging message 105 (FIG. 1) to the idle-mode mobile station 106 (FIG. 1). The processing circuitry 406 may determine the indicated time-slot and the paging carrier (e.g., using a device identifier and parameters) from parameters provided within the paging information message 103. The processing circuitry 406 may also configure the idle-mode mobile station 106 to monitor the indicated paging carrier 205 during the indicated time-slot 203 of a paging listening interval 200 (FIG. 2) for receipt of a paging message 105 directed to the idle-mode mobile station 106.

In some embodiments, when the wireless device 400 is a base station, such as base station 102 (FIG. 1), the physical layer circuitry 402 may be configured to transmit a multicarrier paging information message 103 to indicate a time-slot 203 and paging carrier 205 for a subsequent transmission of a paging message 105 to the idle-mode mobile station 106. The processing circuitry 406 may be configured to generate the parameters to be included in the multicarrier paging information message 103 as described above.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by a base station for transmnitting a paging message to a mobile station during idle mode, the method comprising:
providing a mobile station with a paging offset and a paging cycle to indicate to the mobile station a location of the paging listening interval within a frame structure, the paging offset and the paging cycle being provided by the base station prior to the mobile station entering idle-mode; and
transmitting a multicarrier paging information message to indicate a time-slot and paging carrier for a subsequent transmission of a paging message to the mobile station during idle mode,
wherein the mobile station during idle mode is configured to monitor the indicated paging carrier during the indicated time-slot of a paging listening internval for receipt of a paging message directed to the mobile station.

2. The method of claim 1 wherein the base station transmits the paging message to the idle-mode mobile station on the paging carrier during the indicated time-slot of the paging listening interval of the idle-mode mobile station.

3. The method of claim 2 wherein the indicated time-slot and the paging carrier are determined by the idle-mode mobile station using a device identifier of the idle-mode mobile station and hash modulo parameters provided within the paging information message.

4. The method of claim 3 wherein the method further comprises configuring the multicarrier paging information message to include a time-slot hash modulo (HMT) parameter and a carrier hash modulo (HMC) parameter,
wherein the idle-mode mobile station is configured to determine the paging carrier and the indicated time-slot by performing modular operations on the device identifier, the time-slot hash modulo parameter and the carrier hash modulo parameter.

5. The method of claim 1 further comprising selecting the paging carrier from one of the plurality of carriers of the multicarrier channel.

6. The method of claim 1 wherein the multicarrier paging information message is transmitted by the base station on a plurality of carriers of a multicarrier channel to mobile stations associated with the base station that are in idle-mode.

7. The method of claim 6 wherein the multicarrier paging information message includes:
a field to indicate a number of carriers used for transmission of the paging message; and
a bitmap having bits set to indicate which carriers of the plurality are used as paging carriers.

8. The method of claim 1 wherein the base station and the mobile stations are configured to operate in a broadband wireless access network and communicate using an OFDMA communication technique.

9. A method performed by a base station for transmitting a paging message to an idle-mode mobile station, the method comprising:
transmitting a multicarrier paging information message to indicate a time-slot ane paging carrier for a subsequent transmission of a paging message to the idle-mode mobile station,
wherein the idle-mode mobile station is configured to monitor the indicated paging carrier during the indicated time-slot of a paging listening interval for receipt of a paging message directed to the idle-mode mobile station,
wherein the paging message for an idle-mode mobile station is to indicate that that there is downlink traffic for an idle-mode mobile station, and
wherein the paging message is transmitted once every paging cycle during a paging listening interval.

10. A method performed by a base station for transmitting a paging message to an idle-mode mobile station the method comprising:
transmitting a multicarrier paging information message to indicate a time-slot and paging carrier for a subsequent transmission of a paging message to the idle-mode mobile station, wherein the idle-mode mobile station is configured to monitor the indicated paging carrier during the indicated time-slot of a paging listening interval for receipt of a paging message directed to the idle-mode mobile station, wherein the multicarrier paging information message is transmitted by the base station on a plurality of carriers of a multicarrier channel to mobile stations associated with the base station that are in idle-mode, and wherein the multicarrier paging information message is transmitted by the base station as part of a paging group identifier information message at the beginning of the paging listening interval of the idle-mode mobile station.

11. The method of claim 10 wherein the multicarrier paging information message is transmitted by the base station as either a multicast or a broadcast message.

12. In a broadband wireless access network, a method performed by an idle-mode mobile station for receiving a paging message, the method comprising:

receiving multicarrier paging information message indicating a time-slot and paging carrier for a subsequent transmission of a paging message to the idle-mode mobile station;

monitoring the indicated paging carrier during the indicated time-slot of a paging listening interval for receipt of a paging message directed to the idle-mode mobile station; and determining the indicated time-slot and the paging carrier using a device identifier and hash modulo parameters provided within the paging information message.

13. The method of claim 12 wherein determining the indicated time-slot and the paging carrier comprises determine the paging carrier and the indicated time-slot by performing modular operations on the device identifier, a time-slot hash modulo parameter and a carrier hash modulo parameter provided within the paging information message.

14. The method of claim 12 further comprising:

refraining from listening for the paging message on carriers except for the indicated paging carrier determined from the paging information message; and refraining from listening for the paging message during time-slots of the paging listening interval except for the time-slot determined from the paging information message.

15. The method of claim 12 further comprising receiving the multicarrier paging information message on a plurality of carriers of a multicarrier channel, the multicarrier paging information message having been transmitted by a base station to mobile stations associated with the base station that are in idle-mode.

16. A mobile station configured to operate in idle-mode in a broadband wireless access network, the mobile station comprising:

physical-layer circuitry receive a mullticarrier paging information message indicating a time-slot and paging carrier for a subsequent transmission of a paging message to the idle-mode mobile station: and processing circuitry to determine the indicated time-slot and the paging carrier using a device identifier and parameters provided within the paging information message, wherein the processing circuitry is to configure the mobile station to monitor the indicated paging carrier during the indicated the time-slot of a paging listening interval for receipt of a paging message directed to the idle-mode mobile station, wherein the processing circuitry is further configured to determine the indicated time-slot and the paging carrier using a device identifier and hash modulo parameters provided within the paging information message.

17. The mobile station of claim 16 wherein the processing circuitry is further configured to determine the indicated time-slot and the paging carrier by performing modular operations on the device identifier, a time-slot hash modulo parameter and a carrier hash modulo parameter provided within the paging information message.

18. A base station configured to:

transmit a multicarrier paging information message to indicate a time-slot and paging carrier for a subsequent transmission of a paging message to an idle-mode mobile station; and transmit the paging message to the idle-mode mobile station on the paging carrier during the indicated time-slot of the paging listening interval of the idle-mode mobile station, wherein the idle-mode mobile station is configured to monitor the indicated paging carrier during the indicated time-slot of a paging listening interval for receipt of a paging message directed to the idle-mode mobile station, wherein the base station is further configured to include hash modulo parameters within the paging information message to allow the idle-mode mobile station to determine the indicated time-slot and the paging carrier using a device identifier.

19. The base station of claim 18 wherein hash modulo parameters include a time-slot hash modulo (HMT) parameter and a carrier hash modulo (HMC) parameter, wherein the idle-mode mobile station is configured to determine the paging carrier and the indicated time-slot by performing modular operations on the device identifier, the time-slot hash modulo parameter and the carrier hash modulo parameter.

* * * * *

UNITED STATES PATENT AND TRADEMARK OFFICE
CERTIFICATE OF CORRECTION

| | | |
|---|---|---|
| PATENT NO. | : 8,441,984 B2 | Page 1 of 1 |
| APPLICATION NO. | : 12/862120 | |
| DATED | : May 14, 2013 | |
| INVENTOR(S) | : Venkatachalam et al. | |

It is certified that error appears in the above-identified patent and that said Letters Patent is hereby corrected as shown below:

In the Claims

In column 5, line 59, in Claim 1, delete "transmnitting" and insert --transmitting--, therefor In column 6, line 7, in Claim 1, delete "internval" and insert --interval--, therefor In column 6, line 48, in Claim 9, delete "ane" and insert --and--, therefor In column 6, line 57, in Claim 9, before "there", delete "that", therefor In column 6, line 62, in Claim 10, after "station", insert --,--, therefor In column 7, line 22, in Claim 12, after "receiving", insert --a--, therefor In column 8, line 4, in Claim 16, delete "mullticarrier" and insert --multicarrier--, therefor In column 8, line 7, in Claim 16, delete "station:" and insert --station;--, therefor In column 8, line 14, in Claim 16, after "indicated", delete "the", therefor Signed and Sealed this
Ninth Day of December, 2014

Michelle K. Lee
*Deputy Director of the United States Patent and Trademark Office*